US012782735B1

(12) United States Patent
Ott et al.

(10) Patent No.: US 12,782,735 B1
(45) Date of Patent: Nov. 3, 2026

(54) OPTICAL SYSTEMS WITH HOLOGRAPHIC GLINT SOURCES

(71) Applicant: Apple Inc., Cupertino, CA (US)

(72) Inventors: Daniel Ott, Boulder, CO (US); Adam C Urness, Boulder, CO (US); Maria I Campana, Boulder, CO (US); Ariel Lipson, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 200 days.

(21) Appl. No.: 18/597,898

(22) Filed: Mar. 6, 2024

Related U.S. Application Data

(60) Provisional application No. 63/489,966, filed on Mar. 13, 2023.

(51) Int. Cl.
*G02B 27/01* (2006.01)
*G02B 5/32* (2006.01)
*G02B 27/00* (2006.01)

(52) U.S. Cl.
CPC ........... *G02B 27/0172* (2013.01); *G02B 5/32* (2013.01); *G02B 27/0093* (2013.01); *G02B 27/0103* (2013.01); *G02B 2027/0174* (2013.01)

(58) Field of Classification Search
CPC ........ G02B 27/0172; G02B 2027/0174; G02B 27/0093
See application file for complete search history.

(56) References Cited

U.S. PATENT DOCUMENTS 11,927,765 B2 3/2024 Ayres et al.
12,001,017 B1 * 6/2024 Lee .................... G02B 27/0093
2013/0077049 A1 * 3/2013 Bohn ................. G02B 27/0093 351/210
2018/0046859 A1 * 2/2018 Jarvenpaa .............. A61B 3/113
2019/0056599 A1 * 2/2019 Reshidko ........... G02B 27/0172
2019/0086674 A1 * 3/2019 Sinay ................. G02B 27/0172
2019/0155046 A1 * 5/2019 Wall ........................ G06F 3/013
2020/0012095 A1 * 1/2020 Edwin ................ G02B 27/0093

(Continued)

FOREIGN PATENT DOCUMENTS

CN 212933036 U * 4/2021

OTHER PUBLICATIONS

U.S. Appl. No. 18/262,902, filed Jul. 25, 2023.

(Continued)

*Primary Examiner* — Michael Stahl
(74) *Attorney, Agent, or Firm* — Treyz Law Group, P.C.; Michael H. Lyons

(57) ABSTRACT

An electronic device include a projector that generates image light propagated by a waveguide. An output coupler may couple the image light out of the waveguide and towards an eye box. An infrared emitter may emit infrared light that is coupled into the waveguide. A set of discrete holographic diffusers may be arranged in a ring on the waveguide around the periphery of the output coupler. Each holographic diffuser may include a set of holograms that diffracts the infrared light from a given incident angle onto a range of different output angles. The infrared light may reflect off an eye in the eye box. The reflected infrared light may be captured by an infrared sensor for performing gaze tracking. The holographic diffusers may effectively form virtual point sources for the infrared light around the output coupler without obstructing the field of view of the eye box.

18 Claims, 4 Drawing Sheets

(56) References Cited

U.S. PATENT DOCUMENTS

| | | | | |
|---|---|---|---|---|
| 2021/0103087 | A1* | 4/2021 | Wei | G06F 3/013 |
| 2022/0300073 | A1* | 9/2022 | Reshidko | G06V 40/19 |
| 2022/0365596 | A1* | 11/2022 | Mattila | G02B 6/00 |
| 2023/0122300 | A1* | 4/2023 | Tammela | G02B 27/0172 348/51 |
| 2024/0036325 | A1 | 2/2024 | Afek et al. | |
| 2024/0085703 | A1* | 3/2024 | Chen | G02B 27/0093 |

OTHER PUBLICATIONS

U.S. Appl. No. 18/349,498, filed Jul. 10, 2023.
U.S. Appl. No. 18/349,473, filed Jul. 10, 2023.
U.S. Appl. No. 18/525,306, filed Nov. 30, 2023.
U.S. Appl. No. 18/462,317, filed Sep. 6, 2023.

* cited by examiner

OPTICAL SYSTEMS WITH HOLOGRAPHIC GLINT SOURCES

This application claims the benefit of U.S. Provisional Patent Application No. 63/489,966, filed Mar. 13, 2023, which is hereby incorporated by reference herein in its entirety.

BACKGROUND

This disclosure relates to optical systems such as optical systems in electronic devices having displays.

Electronic devices can include displays that provide images near the eyes of a user. Such electronic devices often include augmented or virtual reality headsets with displays having optical elements. If care is not taken, some of the optical elements can be bulky, unsightly, or can obstruct light provided to the eyes.

SUMMARY

An electronic device may have a display system for providing image light to an eye box. The display system may include a waveguide. A projector may generate image light. An input coupler may couple the image light into the waveguide. An output coupler may couple the image light out of the waveguide and towards the eye box.

The display system may include an optical emitter that emits infrared light. An input coupler may couple the infrared light into the waveguide. The infrared light may be diverging in an unguided direction. The waveguide may include a set of discrete holographic diffusers arranged in a ring pattern around a lateral periphery of the output coupler. Each holographic diffuser may include a respective set of one or more holograms that diffracts the infrared light from a given incident angle or range of incident angles onto a range of different output angles to couple the infrared light out of the waveguide. The infrared light may reflect off an eye in the eye box. The reflected infrared light may be captured by an infrared sensor for performing gaze tracking. The holographic diffusers may effectively form virtual point sources for the infrared light around the output coupler without obstructing the field of view of the eye box.

DETAILED DESCRIPTION

Figure 1:
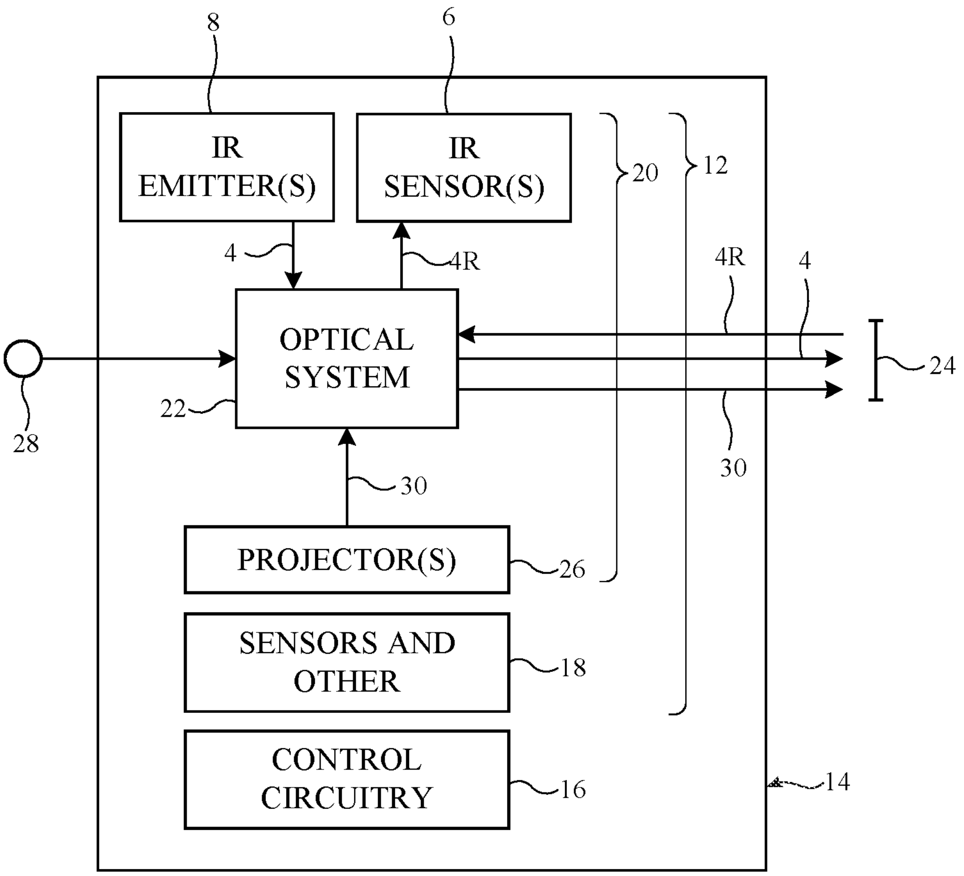
FIG. 1 is a diagram of an illustrative system having a display with a gaze tracking sensor in accordance with some embodiments.

System 10 of FIG. 1 may be an electronic device such as a head-mounted device having one or more displays. The displays in system 10 may include near-eye displays 20 mounted within support structure (housing) 14. Support structure 14 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display projectors such as projectors 26 (sometimes referred to herein as display modules 26) and one or more optical systems such as optical systems 22. Projectors 26 may be mounted in a support structure such as support structure 14. Each projector 26 may emit image light 30 that is redirected towards a user's eyes at eye box 24 using an associated one of optical systems 22. Image light 30 may be, for example, visible light (e.g., including wavelengths from 400-700 nm) that contains and/or represents something viewable such as a scene or object (e.g., as modulated onto the image light using the image data provided by the control circuitry to the display module).

The operation of system 10 may be controlled using control circuitry 16. Control circuitry 16 may include storage and processing circuitry for controlling the operation of system 10. Control circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may include one or more processors (e.g., microprocessors, microcontrollers, digital signal processors, baseband processors, etc.), power management units, audio chips, graphics processing units, application specific integrated circuits, and other integrated circuits. Software code may be stored on storage in control circuitry 16 and run/executed on processing circuitry in control circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Projectors 26 may include liquid crystal displays, organic light-emitting diode displays, laser-based displays, or displays of other types. Projectors 26 may include light sources, emissive display panels, transmissive display panels that are illuminated with illumination light from light sources to produce image light, reflective display panels such as digital micromirror display (DMD) panels and/or liquid crystal on silicon (LCOS) display panels that are illuminated with illumination light from light sources to produce image light 30, etc.

Optical systems 22 may form lenses that allow a viewer (e.g., a user's eyes at eye box 24) to view images on display(s) 20. There may be two optical systems 22 (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 22 may be selected so that any gap present between the displays will not be visible to a user (e.g., so that the images of the left and right displays overlap or merge seamlessly).

If desired, optical system 22 may contain components (e.g., an optical combiner, etc.) to allow real-world light (sometimes referred to as world light, external light, environmental light, or ambient light) from real-world (external) objects such as object 28 to be optically combined with virtual (computer-generated) images such as virtual images in image light 30. In this type of system, which is sometimes referred to as an augmented reality system, a user of system 10 may view both real-world content (e.g., world light from object 28) and computer-generated content that is overlaid on top of the real-world content. Camera-based augmented reality systems may also be used in device 10 (e.g., in an arrangement in which a camera captures real-world images of object 28 and this content is digitally merged with virtual content at optical system 22).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

If desired, system 10 may include an optical sensor. The optical sensor may be used to gather optical sensor data associated with a user's eyes at eye box 24. The optical sensor may, for example, be a gaze tracking sensor that gathers optical sensor data such as gaze image data (gaze tracking image data or gaze tracking sensor data) from a user's eye at eye box 24. Control circuitry 16 may process the optical sensor data to identify and track the direction of the user's gaze in real time. Control circuitry 16 may perform any desired operations based on the tracked direction of the user's gaze over time.

As shown in FIG. 1, the optical sensor (gaze tracking sensor) may include one or more optical emitters such as infrared emitter(s) 8 and one or more optical receivers (sensors) such as infrared sensor(s) 6 (sometimes referred to herein as optical sensor 6). Infrared emitter(s) 8 may include one or more light sources that emit sensing light such as light 4. Light 4 may be used for performing optical sensing on/at eye box 24 (e.g., gaze tracking) rather than conveying pixels of image data such as in image light 30. Light 4 may include infrared light at infrared (IR) wavelengths and/or near-infrared (NIR) wavelengths (e.g., any desired wavelengths from around 700 nm to around 10 μm). Light 4 may additionally or alternatively include wavelengths less than 700 nm if desired. Light 4 may sometimes be referred to herein as sensor light 4.

Infrared emitter(s) 8 may direct light 4 towards optical system 22. Optical system 22 may direct the light 4 emitted by infrared emitter(s) 8 towards eye box 24. Light 4 may enter the user's eye at eye box 24 and may reflect off portions (regions) of the user's eye (e.g., the user's retina, iris, and cornea) as reflected light 4R (sometimes referred to herein as reflected sensor light 4R or a reflected version of light 4). Optical system 22 may receive reflected light 4R and may direct reflected light 4R towards infrared sensor(s) 6. Infrared sensor(s) 6 may receive reflected light 4R from optical system 22 and may gather (e.g., generate, measure, sense, produce, etc.) optical sensor data in response to the received reflected light 4R. Infrared sensor(s) 6 may include an image sensor or camera (e.g., an infrared image sensor or camera), for example. Infrared sensor(s) 6 may include, for example, one or more image sensor pixels (e.g., arrays of image sensor pixels). The optical sensor data may include image sensor data (e.g., image data, infrared image data, one or more images, etc.). Infrared sensor(s) 6 may pass the optical sensor data to control circuitry 16 for further processing.

Figure 2:
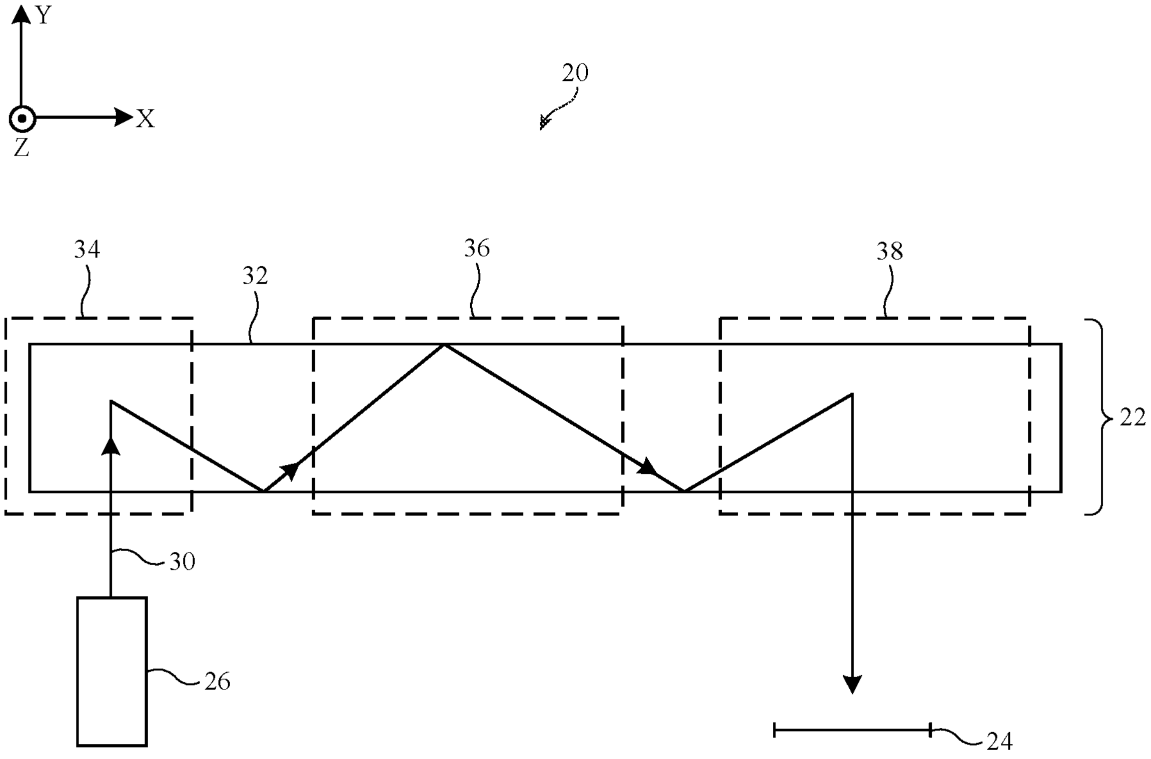
FIG. 2 is a top view of an illustrative optical system for a display having a waveguide with optical couplers in accordance with some embodiments.

FIG. 2 is a top view of an illustrative display 20 that may be used in system 10 of FIG. 1. As shown in FIG. 2, display 20 may include a projector such as projector 26 and an optical system such as optical system 22. Optical system 22 may include optical elements such as one or more waveguides 32. Waveguide 32 may include one or more stacked substrates (e.g., stacked planar and/or curved layers sometimes referred to herein as waveguide substrates) of optically transparent material such as plastic, polymer, glass, etc.

If desired, waveguide 32 may also include one or more layers of holographic recording media (sometimes referred to herein as holographic media, grating media, or diffraction grating media) on which one or more diffractive gratings are recorded (e.g., holographic phase gratings, sometimes referred to herein as holograms, surface relief gratings, etc.). A holographic recording may be stored as an optical interference pattern (e.g., alternating regions of different indices of refraction) within a photosensitive optical material such as the holographic media. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating medium may include photopolymers, gelatin such as dichromated gelatin, silver halides, holographic polymer dispersed liquid crystal, or other suitable holographic media.

Diffractive gratings on waveguide 32 may include holographic phase gratings such as volume holograms (sometimes referred to herein as volume phase holograms (VPHs)) or thin-film holograms, meta-gratings, or any other desired diffractive grating structures. The diffractive gratings on waveguide 32 may also include surface relief gratings (SRGs) disposed at, in, or on one or more surfaces of the substrates in waveguide 32 (e.g., as modulations in thickness of a SRG medium layer layered onto a lateral surface of waveguide 32), gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles). Other light redirecting elements such as louvered mirrors may be used in place of diffractive gratings in waveguide 32 if desired (e.g., within separate waveguide layers). The diffractive gratings may include meta-materials or metasurfaces if desired.

As shown in FIG. 2, projector 26 may generate (e.g., produce and emit) image light 30 associated with image content to be displayed to eye box 24 (e.g., image light 30 may convey a series of image frames for display at eye box 24). Image light 30 may be collimated using a collimating lens in projector 26 if desired. Optical system 22 may be used to present image light 30 output from projector 26 to eye box 24. If desired, projector 26 may be mounted within support structure 14 of FIG. 1 while optical system 22 may be mounted between portions of support structure 14 (e.g., to form a lens that aligns with eye box 24). Other mounting arrangements may be used, if desired.

Optical system 22 may include one or more optical couplers (e.g., light redirecting elements) such as input coupler 34, cross-coupler 36, and output coupler 38. In the example of FIG. 2, input coupler 34, cross-coupler 36, and output coupler 38 are formed at or on waveguide 32. Input coupler 34, cross-coupler 36, and/or output coupler 38 may be completely embedded within the substrate layers of waveguide 32, may be partially embedded within the substrate layers of waveguide 32, may be mounted to waveguide 32 (e.g., mounted to an exterior surface of waveguide 32), etc.

Waveguide 32 may guide image light 30 down its length via total internal reflection. Input coupler 34 may be configured to couple image light 30 from projector 26 into waveguide 32 (e.g., within a total-internal reflection (TIR) range of the waveguide within which light propagates down the waveguide via TIR), whereas output coupler 38 may be configured to couple image light 30 from within waveguide 32 (e.g., propagating within the TIR range) to the exterior of waveguide 32 and towards eye box 24 (e.g., at angles outside of the TIR range). Input coupler 34 may include an input coupling prism, an edge or face of waveguide 32, a lens, a steering mirror or liquid crystal steering element, diffractive grating structures (e.g., volume holograms, SRGs, etc.), partially reflective structures (e.g., louvered mirrors), or any other desired input coupling elements.

As an example, projector 26 may emit image light 30 in direction +Y towards optical system 22. When image light 30 strikes input coupler 34, input coupler 34 may redirect image light 30 so that the light propagates within waveguide 32 via total internal reflection towards output coupler 38 (e.g., in direction +X within the TIR range of waveguide 32). When image light 30 strikes output coupler 38, output coupler 38 may redirect image light 30 out of waveguide 32 towards eye box 24 (e.g., back along the Y-axis). In implementations where cross-coupler 36 is formed on waveguide 32, cross-coupler 36 may redirect image light 30 in one or more directions as it propagates down the length of waveguide 32 (e.g., towards output coupler 38 from a direction of propagation as coupled into the waveguide by the input coupler). In redirecting image light 30, cross-coupler 36 may also perform pupil expansion on image light 30 in one or more directions. In expanding pupils of the image light, cross-coupler 36 may, for example, help to reduce the vertical size of waveguide 32 (e.g., in the Z direction) relative to implementations where cross-coupler 36 is omitted. Cross-coupler 36 may therefore sometimes also be referred to herein as pupil expander 36 or optical expander 36. If desired, output coupler 38 may also expand image light 30 upon coupling the image light out of waveguide 32.

Input coupler 34, cross-coupler 36, and/or output coupler 38 may be based on reflective and refractive optics or may be based on diffractive (e.g., holographic) optics. In arrangements where couplers 34, 36, and 38 are formed from reflective and refractive optics, couplers 34, 36, and 38 may include one or more reflectors (e.g., an array of micromirrors, partial mirrors, louvered mirrors, or other reflectors). In arrangements where couplers 34, 36, and 38 are based on diffractive optics, couplers 34, 36, and 38 may include diffractive gratings (e.g., volume holograms, surface relief gratings, etc.). In one illustrative implementation that is described herein as an example, input coupler 34, cross-coupler 36, and output coupler 38 may each be formed from SRGs that are disposed in different respective regions of the same layer of SRG medium layered onto the same lateral surface (side) of waveguide 32 (e.g., opposite eye box 24). The SRGs may have sufficient bandwidth to diffract all wavelengths of image light 30, such that additional stacked waveguides with additional SRGs for handling different wavelengths are not necessary.

The example of FIG. 2 is merely illustrative. Optical system 22 may include multiple waveguides that are laterally and/or vertically stacked with respect to each other. Each waveguide may include one, two, all, or none of couplers 34, 36, and 38. Waveguide 32 may be at least partially curved or bent if desired. One or more of couplers 34, 36, and 38 may be omitted. If desired, optical system 22 may include a single optical coupler that performs the operations of both cross-coupler 36 and output coupler 38 (sometimes referred to herein as an interleaved coupler, a diamond coupler, or a diamond expander) or cross-coupler 36 may be separate from output coupler 38. Output coupler 38 may sometimes be referred to herein as visible light output coupler.

The operation of waveguide 32 on image light 30 is shown in FIG. 2. Waveguide 32 may also be used to direct light 4 from infrared emitter(s) 8 towards eye box 24 and to direct reflected light 4R from eye box 24 towards infrared sensor(s) 6 (FIG. 1). Additionally or alternatively, optical system 22 may direct world light towards eye box 24 and/or towards a world-facing camera in system 10.

Figure 3:
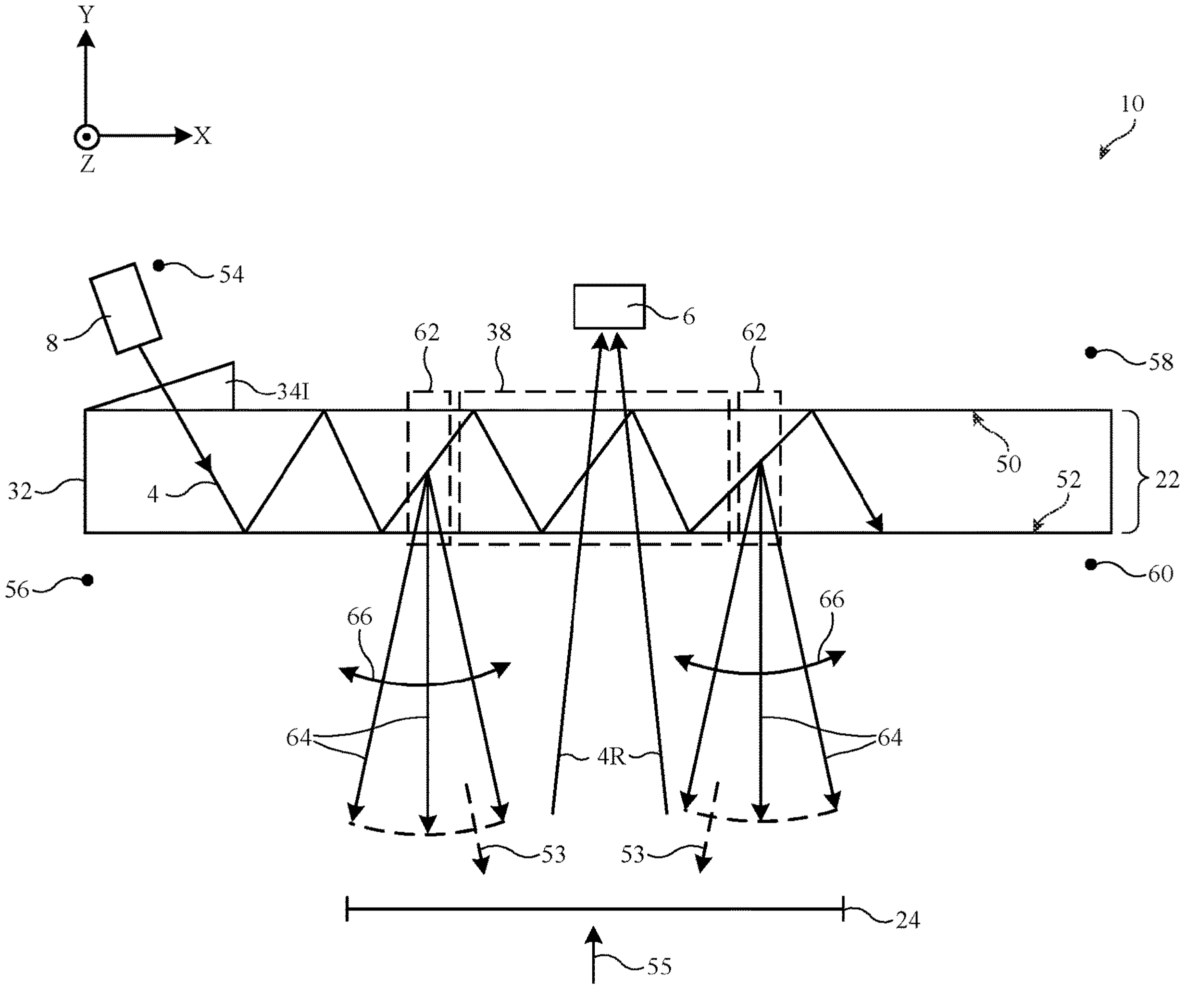
FIG. 3 is a top view of an illustrative waveguide having holographic diffusers around an output coupler for diffracting infrared light towards an eye box in accordance with some embodiments.

FIG. 3 is a top view showing one example of how optical system 22 may direct light 4 from infrared emitter(s) 8 towards eye box 24 and may direct reflected light 4R from eye box 24 towards infrared sensor(s) 6 (FIG. 1). In the example of FIG. 3, waveguide 32 and image light 30 are not shown for the sake of clarity. While an implementation in which the same waveguide 32 directs image light 30 (FIG. 2) and light 4 for performing gaze tracking is described herein as an example, optical system 22 (FIG. 1) may include different waveguides for directing image light 30 and light 4 if desired.

As shown in FIG. 3, waveguide 32 may have a first lateral surface 50 and a second lateral surface 52 opposite lateral surface 50. Lateral surface 50 may face the world, scene, or environment in front of system 10 whereas lateral surface 52 faces eye box 24. Infrared emitter(s) 8 may output light 4 towards waveguide 32. Waveguide 32 may include an input coupler for light 4 such as input coupler 34I. Input coupler 34I may couple light 4 into waveguide 32 within the TIR range of waveguide 32. As such, the light 4 coupled into waveguide 32 by input coupler 34I may propagate down the length of waveguide 32 via TIR (e.g., in the +X direction).

In the example of FIG. 3, input coupler 34I is a transmissive input coupling prism mounted to lateral surface 50 of waveguide 32. As such, input coupler 34I may redirect incident light 4 into waveguide 32 (via refraction) at angles within the TIR range of waveguide 32. This example is merely illustrative. If desired, input coupler 34I may be a reflective input coupling prism that receives light 4 through waveguide 32 (e.g., in implementations where infrared emitter(s) 8 face lateral surface 52 of waveguide 32 rather than lateral surface 50). In general, input coupler 34I may include any desired optical coupler, such as an angled surface or facet of waveguide 32, one or more diffractive gratings (e.g., volume holograms, an SRG, metagratings, etc.), one or more partial reflectors (e.g., a partially reflective louvered mirror), etc. Input coupler 34I may be the same input coupler 34 used to couple image light 30 into waveguide 32 (FIG. 2) or may be separate input coupler from the input coupler 34 used to couple image light 30 into waveguide 32.

Infrared sensor(s) 6 and infrared emitter(s) 8 may be co-located or may be disposed at separate locations in the display. If desired, infrared sensor(s) 6 and/or infrared emitter(s) 8 may be disposed within or mounted to projector 26 (FIG. 2) or a portion of the display that is separate from projector 26. If desired, one or more collimating lenses may be optically coupled between infrared emitter(s) 8 and waveguide 32 (e.g., for collimating light 4) and/or between waveguide 32 and infrared sensor(s) 6 (e.g., for collimating reflected light 4R).

Light 4 may propagate down waveguide 32 via TIR. Light 4 may continue propagating along waveguide 32 through output coupler 38 without being diffracted by output coupler 38 (e.g., because output coupler 38 is Bragg-matched to visible wavelengths for coupling image light 30 out of waveguide 32 but not IR or NIR wavelengths). On the other hand, waveguide 32 may include one or more additional output couplers such as infrared output couplers 62 that couple light 4 out of waveguide 32 and towards the user's eye at eye box 24 without diffracting image light 30 (e.g., infrared output couplers 62 may be Bragg matched to light 4 but not image light 30). As shown in FIG. 3, waveguide 32 may include a set of one or more discrete infrared output couplers 62 disposed on waveguide 32 (or a separate waveguide) around the lateral periphery of output coupler 38. There may be, for example, two, three, four, more than four, six, more than six, more than ten, or more than twelve discrete infrared output couplers 62 on waveguide 32. The light 4 incident upon infrared output couplers 62 may be coupled out of waveguide 32 and towards eye box 24 by infrared output couplers 62. While the bounce period of light 4 within waveguide 32 is illustrated as relatively wide and infrared output couplers 62 are illustrated as being relatively narrow in FIG. 3 for the sake of clarity, in general each infrared output coupler 62 may laterally span most or all of a single bounce period of light 4 within waveguide 32.

Each infrared output coupler 62 may include a respective set of one or more diffractive gratings such as one or more holograms (e.g., volume holograms). The set of holograms in each infrared output coupler 62 may sometimes also be referred to herein as a holographic diffuser. Each holographic diffuser may include a respective diffuser hologram or may include a set of multiplexed holograms that perform the same optical function as the diffuser hologram. Examples in which the holographic diffuser includes a diffuser hologram is described herein as an example. Rather than diffracting light from a single input angle onto a single output angle, the diffuser hologram in each infrared output coupler 62 may diffract (e.g., diffractively diffuse) light 4 incident from a single direction (input angle) onto a diverging range of different output angles 66, as shown by arrows 64. The range of output angles 66 of each infrared output coupler 62 may be selected to be outside the TIR range of waveguide 32 and oriented towards eye box 24. This may serve to couple light 4 out of waveguide 32 and towards eye box 24.

In other words, each infrared output coupler 62 may include a set of one or more holograms (e.g., a diffuser hologram or a set of multiplexed Bragg gratings) that collectively diffract infrared light from a single incident angle within waveguide 32 onto a cone of output angles (shown by arrows 64), where the angle of the cone is spanned/defined by the range of output angles 66. This may serve to couple light 4 out of waveguide 32 and towards eye box 24 for reflection off the user's eye. The range of output angles 66 may span any desired angular range (e.g., 0-90 degrees, more than 10 degrees, more than 20 degrees, more than 30 degrees, more than 40 degrees, more than 50 degrees, more than 60 degrees, more than 70 degrees, less than 80 degrees, less than 70 degrees, less than 60 degrees, etc.).

If desired, the hologram(s) in each infrared output coupler may be configured (e.g., via selection of the orientation and frequency of the fringes/lines of constant refractive index of the holograms) to exhibit a range of output angles 66 that is tilted at a non-zero angle with respect to the Y-axis (as shown by arrows 53) to more precisely direct light 4 towards one or more desired regions of the eye, given the different lateral locations of the infrared output couplers 62 on waveguide 32. The Y-axis may be oriented parallel to a normal axis of the lateral surfaces of the waveguide, for example. If desired, each infrared output coupler 62 may include a plane-wave-to-diffuser hologram (e.g., a hologram that converts plane waves of incident light 4 into light output across the corresponding range of output angles 66 upon diffraction by the holograms). While illustrated in FIG. 3 as including reflective holograms, the holograms in any of infrared output couplers 62 may be transmissive holograms or reflective holograms.

The light 4 provided to eye box 24 by infrared output couplers 62 may reflect off of one or more portions of the user's eye at eye box 24 as reflected light 4R (e.g., as one or more corneal glints). Infrared sensor(s) 6 may receive reflected light 4R and may generate sensor data (e.g., infrared image sensor data) of reflected light 4R. The sensor data may, for example, include the glints in reflected light 4R. System 10 (FIG. 1) may process the sensor data (e.g., the location of the corneal glints within the FOV of eye box 24) to detect the direction of the user's gaze at eye box 24 (e.g., to perform gaze tracking operations).

In the example of FIG. 3, IR sensor(s) 6 are illustrated as being disposed adjacent to lateral surface 50 of waveguide 32 for the sake of simplicity. This is illustrative and non-limiting. If desired, IR sensor(s) 6 may be disposed at other locations at or adjacent to lateral surface 50 such as at or adjacent to infrared emitter(s) 8 (e.g., at location 54), at or adjacent to the end of waveguide 32 opposite input coupler 34I (e.g., at location 58), at or adjacent to lateral surface 52 of waveguide 32 (e.g., at location 56 or location 60), or elsewhere in the system that is outside the FOV of eye box 24. If desired, waveguide 32 may help to direct reflected light 4R towards IR sensor(s) 6 (e.g., via TIR and using one or more additional infrared input couplers and/or output couplers on waveguide 32) and/or optical system 22 may include other optical components (e.g., lenses, prisms, diffractive gratings, mirrors, etc.) that help to direct reflected light 4R towards the location of IR sensor(s) 6.

Disposing infrared emitter(s) 8 and infrared sensor(s) 6 off-axis from eye box 24 may help to keep the infrared emitter(s) and infrared sensor(s) outside of the FOV of eye box 24, thereby preventing the infrared emitter(s) and infrared sensor(s) from blocking the view of image light 30 (FIG. 2) and/or world light from object 28 (FIG. 1). However, if care is not taken, disposing the infrared emitter(s) and the infrared sensor(s) off-axis from eye box 24 can make it difficult to for the infrared sensor(s) to sense glints in reflected light 4R from the user's retina at eye box 24. By including diffuser holograms in the set of discrete infrared output couplers 62 disposed around the lateral periphery of output coupler 38, light 4 may illuminate the eye at eye box 24 as if infrared emitter(s) 8 where physically disposed on waveguide 32 at the locations of infrared output couplers 62, thereby optimizing the sensing of glints by IR sensor(s) 6, but without infrared emitter(s) 8 blocking any of the FOV of eye box 24. In other words, infrared output couplers 62 may effectively form a set of virtual point sources of light 4 within or adjacent to the FOV of eye box 24 but without obscuring or blocking the view of world light or image light 30 at eye box 24.

Figure 4:
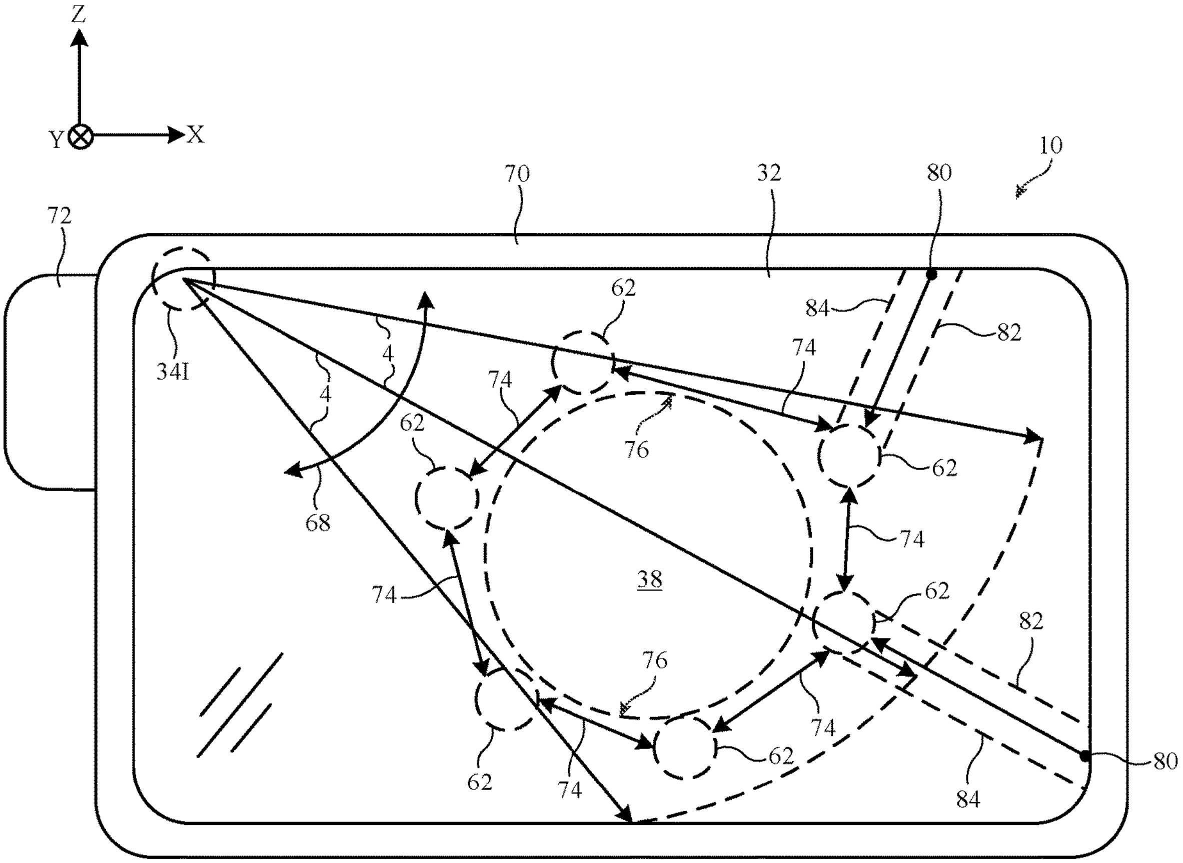
FIG. 4 is a front view showing how holographic diffusers for diffracting infrared light may be distributed in discrete sets around the lateral periphery of an output coupler on a waveguide in accordance with some embodiments.

FIG. 4 is a front view of waveguide 32 (e.g., as viewed in the direction of arrow 55 of FIG. 3). As shown in FIG. 4, waveguide 32 may have an area bounded by a lateral periphery (e.g., within the X-Z plane). The lateral periphery (edges) of waveguide 32 may be mounted to a support structure or housing of system 10 such as frame 70. The support structure or housing of system 10 may also include a temple portion 72 extending in the −Y direction from one edge of frame 70. If desired, the support structure or housing of system 10 may include a leg (e.g., for resting over the user's ear while wearing system 10) that is coupled to temple portion 72 and/or frame 70 by one or more hinges or flexible members. Projector 26 (FIG. 1), IR emitter(s) 8 (FIG. 3), and/or IR sensor(s) 6 (FIG. 3) may be mounted to or disposed within temple portion 72 if desired. Alternatively, IR emitter(s) 8 and/or IR sensor(s) 6 may be disposed on or within frame 70 to help keep the emitter(s) and sensor(s) out of view.

As shown in FIG. 4, output coupler 38 may have a lateral periphery defined by one or more peripheral edges 76. Output coupler 38 may have any desired lateral shape (e.g., a circular shape, an elliptical shape, a rectangular shape, or any other desired shape having any number of curved and/or straight edges). A set of discrete infrared output couplers 62 may be disposed around the lateral periphery of output coupler 38. Infrared output couplers 62 may have lateral edges at, adjacent to, or separated from the peripheral edges 76 of output coupler 38. In other implementations, one or more of infrared output couplers 62 may at least partially overlap or may completely overlap output coupler 38. Since infrared output couplers 62 are discrete, waveguide 32 may include regions 74 between infrared output couplers 62 that do not include diffractive gratings (e.g., holograms) that diffract light 4. Waveguide 32 may, if desired, be free from diffractive gratings within regions 74.

The number and locations of infrared output couplers 62 may be selected to provide optimal illumination of one or more regions of the eye at eye box 24 (e.g., for producing sufficient glints for capture by IR sensor(s) 6). Waveguide 32 may include any desired number of one or more discrete infrared output couplers 62 disposed in any desired pattern around or surrounding output coupler 38. Each infrared output coupler 62 may have the same shape and size or, if desired, two or more infrared output couplers 62 may have different sizes and/or shapes. In general, each infrared output coupler 62 may have any desired lateral shape (e.g., a circular shape, an elliptical shape, a rectangular shape, or any other desired shape having any number of curved and/or straight edges).

Input coupler 34I may couple light 4 into waveguide 32. Light 4 may propagate down waveguide 32 towards output coupler 38 and infrared output couplers 62 via TIR. If desired, light 4 may be coupled into waveguide 32 as light that diverges in the unguided direction (e.g., light that diverges within the X-Z plane in a direction perpendicular to the direction of TIR propagation, such as in the direction of arrows 68). Light 4 may be emitted by IR emitter(s) 8 as light that diverges in the unguided direction and/or may be converted to light that diverges in the unguided direction by input coupler 34I or other optical elements such as lenses or diffractive gratings between IR emitter(s) 8 and input coupler 34I. This way may allow light 4 to reach each of the infrared output couplers 62 around output coupler 38 despite the large lateral area of output coupler 38. While diffraction of light 4 by infrared output couplers 62 is not shown in FIG. 4 for the sake of clarity, infrared output couplers 62 may effectively form a ring or ring pattern of virtual point sources of light 4 (sometimes referred to herein as a ring illuminator) around the periphery of output coupler 38 for illuminating eye box 24 using light 4 (e.g., as shown in FIG. 3). Infrared output couplers 62 may be arranged in other patterns if desired (e.g., in a line, a two dimensional grid, a hexagonal pattern, or a pattern following any desired shape having any desired number of straight and/or curved edges). Some, none, or all of the ring or other pattern may be completely non-overlapping with respect to output coupler 38, may be partially overlapping output coupler 38, or may completely overlap output coupler 38 (e.g., a first subset of one or more of the infrared output couplers 62 may partially or completely overlap output coupler 38 whereas a second subset of one or more of the infrared output couplers 62 may be non-overlapping with respect to output coupler 38).

The example in which input coupler 34I couples light 4 into waveguide 32 is merely illustrative. If desired, one or more of IR emitter(s) 8 may be disposed at other locations on or around the periphery of waveguide 32. Different IR emitter(s) 8 at different locations may transmit light 4 to different respective infrared output couplers 62 if desired. For example, as shown in FIG. 4, system 10 may include different IR emitters 8 at different respective locations 80 that transmit light 4 into waveguide 32 and towards different respective infrared output couplers 62, as shown by arrows 82 (e.g., within the TIR range of the waveguide either directly or using respective input couplers).

If desired, waveguide 32 may include channels 84 (sometimes referred to herein as waveguide channels or light guide channels) that optically couple each IR emitter 8 (e.g., each location 80) to its respective infrared output coupler 62. The light 4 emitted by each IR emitter 8 may propagate towards its corresponding infrared output coupler 62 via TIR within the respective channel 84. Channels 84 may, for example, have a higher refractive index than the portions of waveguide 32 surrounding the channels. Using channels 84 to propagate light 4 may serve to guide both dimensions of light 4, thereby maximizing the efficiency of the holographic glint sources. While only two channels 84 for propagating light 4 from two locations 80 to two infrared output couplers 62 are shown in FIG. 4 for the sake of clarity, waveguide 32 may include any desired number of channels 84 for propagating light 4 from any desired number of IR emitters 8 (e.g., any desired number of locations 80) to any desired number of infrared output couplers 62 (e.g., all of the infrared output couplers 62 on waveguide 32). In implementations where input coupler 34I couples light 4 into waveguide 32, one or more channels 84 may help to propagate light 4 to each of the infrared output couplers 62.

The IR emitters 8 at locations 80 or that couple light 4 into waveguide 32 through input coupler 34I may include infrared LEDs, lasers, collimated light sources, diverging light sources, or any other desired light sources. While waveguide 32 is sometimes described herein as a single waveguide (e.g., having a single waveguide substrate), waveguide 32 may include multiple stacked waveguides or waveguide substrates. The light 4 from different IR emitters 8 and/or the image light may propagate along any of the stacked waveguide substrates (e.g., different waveguide substrates may be used to propagate light 4 than the image light, may be used to propagate light 4 from different IR emitters to different infrared output couplers, etc.).

The holograms in infrared output couplers 62 may be recorded using any desired hologram recording apparatus and method. For example, the holographic grating medium for infrared output couplers 62 may be illuminated using an object beam and a recording beam in a hologram recording (writing) apparatus. In implementations where an infrared output coupler 62 includes a diffuser hologram (e.g., a plane-wave-to-diffuser hologram), the object beam may pass through an optical diffuser prior to reaching the medium. The optical diffuser may set the FOV of each infrared output coupler (e.g., the range of output angles 66 produced by each infrared output coupler). The reference beam may be a plane wave reference beam. An opaque mask may be provided overlapping the medium. The opaque mask may have a hole that spans the lateral area of a single infrared input coupler 62. The medium may be moved with respect to the hole to record multiple different infrared input couplers 62 at different locations in the medium. Alternatively, a single opaque mask may be provided with multiple holes overlapping the location of each infrared output coupler 62 and all of the infrared output couplers may be written concurrently.

If desired, rather than including a diffuser hologram, the set of holograms in any of infrared output coupler 62 as described herein may include a set of multiplexed gratings (e.g., holograms) that diffracts infrared light from a single incident angle (e.g., within the TIR range of waveguide 32) onto the range of output angles 66 oriented towards eye box 24. The multiplexed gratings may include, for example, sequentially multiplexed Bragg gratings that can be individually programmed/written in the grating medium (e.g., where each grating is Bragg matched to the single incident angle and a different respective output angle within the range of output angles 66). This may, for example, avoid any unwanted noise associated with writing diffuser holograms (e.g., using an object beam passing through a diffuser). Alternatively, if desired, the set of holograms in one or more of the infrared output couplers 62 as described herein may include a set of multiplexed gratings (e.g., holograms) that diffracts infrared light incident from a range of incident angles (e.g., within the TIR range of waveguide 32) onto the range of output angles 66 oriented towards eye box 24.

The foregoing is merely illustrative and various modifications can be made to the described embodiments. The foregoing embodiments may be implemented individually or in any combination.

What is claimed is:

1. An electronic device comprising:

a waveguide configured to propagate visible light, the waveguide having a first lateral surface and a second lateral surface opposite the first lateral surface;

an optical emitter configured to emit infrared light;

an input coupler configured to couple the infrared light into the waveguide, the waveguide being configured to propagate the infrared light;

an output coupler on the waveguide and configured to couple the visible light out of the waveguide through the first lateral surface;

a diffuser hologram on the waveguide, the diffuser hologram being configured to couple the infrared light out of the waveguide through the first lateral surface; and an additional diffuser hologram on the waveguide and laterally separated from the diffuser hologram, the additional diffuser hologram being configured to couple the infrared light out of the waveguide through the first lateral surface, wherein the diffuser hologram and the additional diffuser hologram are disposed on the waveguide around a lateral periphery of the output coupler.

2. The electronic device of claim 1, wherein the diffuser hologram is configured to diffract the infrared light from an incident angle onto a range of different output angles.

3. The electronic device of claim 1, wherein the diffuser hologram and the additional diffuser hologram are non-overlapping with respect to each other and with respect to the output coupler.

4. The electronic device of claim 1, wherein a region of the waveguide interposed between the diffuser hologram and the additional diffuser hologram is free from holograms.

5. The electronic device of claim 1, wherein the infrared light coupled into the waveguide by the input coupler diverges in an unguided direction.

6. The electronic device of claim 1, wherein the waveguide comprises a channel configured to guide the infrared light to the diffuser hologram, the channel having a higher refractive index than a portion of the waveguide surrounding the channel.

7. The electronic device of claim 1, further comprising:

one or more infrared sensors configured to receive a reflected version of the infrared light coupled out of the waveguide by the diffuser hologram.

8. The electronic device of claim 1, further comprising:

a projector configured to generate the visible light, the visible light containing images, wherein the input coupler is configured to couple the visible light into the waveguide.

9. The electronic device of claim 1, further comprising:

a projector configured to generate the visible light, the visible light containing images; and an additional input coupler configured to couple the visible light into the waveguide.

10. An electronic device comprising:

a waveguide configured to propagate, via total internal reflection, visible light and infrared light, the visible light containing images;

a first output coupler configured to couple the visible light out of the waveguide, the first output coupler having a lateral periphery;

a set of discrete output couplers disposed on the waveguide around the lateral periphery of the first output coupler, wherein the set of discrete output couplers is configured to couple the infrared light out of the waveguide and each discrete output coupler in the set of discrete output couplers includes a respective set of one or more holograms;

a first light source configured to emit a first portion of the infrared light towards a first discrete output coupler in the set of discrete output couplers; and a second light source configured to emit a second portion of the infrared light towards a second discrete output coupler in the set of discrete output couplers.

11. The electronic device of claim 10, wherein each discrete output coupler in the set of discrete output couplers is configured to diffract the infrared light from one or more respective incident angles onto a respective cone of output angles.

12. The electronic device of claim 11, wherein the respective cones of output angles are tilted at different respective angles relative to a normal axis of a lateral surface of the waveguide.

13. The electronic device of claim 10, wherein the waveguide has a first channel configured to guide the first portion of the infrared light towards the first discrete output coupler in the set of discrete output couplers and wherein the waveguide has a second channel configured to guide the second portion of the infrared light towards the second discrete output coupler in the set of discrete output couplers.

14. The electronic device of claim 11, further comprising:

one or more cameras configured to capture images of a reflected version of the infrared light coupled out of the waveguide by the set of discrete output couplers; and one or more processors configured to identify a gaze direction based on the captured images.

15. The electronic device of claim 10, wherein the set of one or more holograms in each discrete output coupler of the set of discrete output couplers comprises a respective set of sequentially multiplexed Bragg gratings, each sequentially multiplexed Bragg grating in the set of sequentially multiplexed Bragg gratings being configured to diffract the infrared light onto a different respective output angle.

16. A display comprising:

a projector configured to emit visible light;

an infrared emitter configured to emit infrared light;

a waveguide configured to propagate the visible light and the infrared light via total internal reflection;

an output coupler on the waveguide and configured to couple the visible light out of the waveguide;

holographic diffusers disposed in a ring pattern around the output coupler, the holographic diffusers being configured to couple the infrared light out of the waveguide and being configured to form virtual point sources of the infrared light; and a sensor configured to generate sensor data based on a reflected version of the infrared light coupled out of the waveguide by the holographic diffusers.

17. The display of claim 16, wherein the holographic diffusers comprise volume holograms.

18. The display of claim 16, wherein the holographic diffusers comprise at least four holographic diffusers separated by regions of the waveguide that are free from holographic diffusers.

* * * * *